United States Patent
Choi et al.

(10) Patent No.: US 8,438,143 B2
(45) Date of Patent: May 7, 2013

(54) PRINTING METHOD AND APPARATUS, PRINT CONTROL METHOD, AND MULTIMEDIA APPARATUS

(75) Inventors: Myoung-soon Choi, Suwon-si (KR); Yu-seong Jeon, Suwon-si (KR); Hee-chul Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/612,581

(22) Filed: Nov. 4, 2009

(65) Prior Publication Data

US 2010/0073723 A1    Mar. 25, 2010

Related U.S. Application Data (63) Continuation of application No. 11/332,587, filed on Jan. 17, 2006.

(30) Foreign Application Priority Data

Jan. 21, 2005   (KR) ........................ 10-2005-0005860

(51) Int. Cl.
*G06F 7/00* (2006.01)
*G06F 3/12* (2006.01)
*G06F 15/16* (2006.01)

(52) U.S. Cl.
USPC ........... 707/705; 709/217; 709/218; 709/229; 358/1.15

(58) Field of Classification Search ...... 725/1; 707/705; 709/217–218, 229
See application file for complete search history.

(56) References Cited

U.S. PATENT DOCUMENTS

| | | | |
|---|---|---|---|
| 5,569,038 A | 10/1996 | Tubman et al. | |
| 5,572,442 A | 11/1996 | Schulhof et al. | |
| 5,680,558 A | 10/1997 | Hatanaka et al. | |
| 5,779,038 A | 7/1998 | Herr et al. | |
| 6,128,446 A | 10/2000 | Schrock et al. | |
| 6,388,766 B1 | 5/2002 | Inoue et al. | |
| 6,757,260 B2* | 6/2004 | Pandit | 370/260 |
| 6,771,568 B2 | 8/2004 | Hochendoner | |
| 6,993,536 B2 | 1/2006 | Yamanaka | |
| 7,539,751 B2* | 5/2009 | Yamashita et al. | 360/55 |
| 2002/0051162 A1 | 5/2002 | Kawaguchi et al. | |
| 2002/0054331 A1 | 5/2002 | Takenobu et al. | |
| 2002/0083433 A1 | 6/2002 | Yamanaka | |

(Continued)

FOREIGN PATENT DOCUMENTS

| | | |
|---|---|---|
| DE | 100 01 768 | 8/2000 |
| EP | 0 699 940 | 6/1996 |

(Continued)

OTHER PUBLICATIONS

Communication, dated Nov. 17, 2011, issued by the European Patent Office in corresponding European Application No. 06250245.5.

*Primary Examiner* — Vincent Boccio
(74) *Attorney, Agent, or Firm* — Sughrue Mion, PLLC (57) ABSTRACT

A printing method and apparatus, a print control method, and a multimedia apparatus are provided. The printing method includes receiving a multimedia file or additional information of the multimedia file from a multimedia apparatus; interpreting the multimedia file or the additional information of the multimedia and obtaining at least one item included in the additional information; and printing the obtained at least one item.

21 Claims, 7 Drawing Sheets

U.S. PATENT DOCUMENTS

| | | |
|---|---|---|
| 2002/0173968 A1* | 11/2002 | Parry .............................. 704/500 |
| 2003/0158737 A1* | 8/2003 | Csicsatka ....................... 704/273 |
| 2003/0167173 A1 | 9/2003 | Levy et al. |
| 2003/0177491 A1 | 9/2003 | Butikofer et al. |
| 2004/0073609 A1* | 4/2004 | Maekawa et al. ............. 709/203 |
| 2004/0078293 A1 | 4/2004 | Iverson et al. |
| 2004/0184788 A1* | 9/2004 | Ohmura et al. ................ 386/117 |

FOREIGN PATENT DOCUMENTS

| | | |
|---|---|---|
| EP | 1 235 420 | 8/2002 |
| JP | 02 015375 | 1/1990 |
| JP | 3-203887 | 9/1991 |
| JP | 04 289972 | 10/1992 |
| JP | 11-88815 | 3/1999 |
| JP | 2001-290612 | 10/2001 |
| KR | 2001-0049233 | 6/2001 |
| KR | 2001-0055063 | 7/2001 |
| KR | 2001-0074960 | 8/2001 |
| KR | 2003-0055608 | 7/2003 |
| WO | 99/60775 | 11/1999 |

* cited by examiner

PRINTING METHOD AND APPARATUS, PRINT CONTROL METHOD, AND MULTIMEDIA APPARATUS

CROSS-REFERENCE TO RELATED APPLICATIONS

This application is a continuation of application Ser. No. 11/332,587, filed on Jan. 17, 2006, which claims priority from Korean Patent Application No. 10-2005-0005860, filed on Jan. 21, 2005, in the Korean Intellectual Property Office. The entire disclosures of these prior applications are considered part of the disclosure of this application and are hereby incorporated by reference.

BACKGROUND OF THE INVENTION

1. Field of the Invention

The present invention relates to a printing method and apparatus, a print control method, a multimedia apparatus, and a computer-readable recording medium on which programs for executing the methods are recorded.

2. Description of the Related Art

MPEG Audio Layer 3 (MP3) and Windows Media Audio (WMA) files recently sold or used over the Internet contain various metadata using a tagging format, such as ID3 tags. If data is not contained in an MP3 or WMA file, a user can add the data. While listening to an audio/music file, such as MP3 or WMA audio/music files, a user can view lyrics of the audio/music file displayed on an LCD display. Sometimes, a user may wish to print the lyrics. In particular, if a user studies English using an MP3 or WMA audio file, the user may wish to extract the contents of the audio file and read the extracted contents while listening to the audio file.

Portable multimedia products recently released not only play music but also provide the capability to reproduce moving images, offer image viewers, and print images or texts. If images or texts can be printed, it is also possible to print multimedia meta information of an audio file.

A method of printing metadata contained in an audio file, which is a type of multimedia file, will now be described by way of example. There are several methods of printing lyrics of, for example, an audio file. One typical method involves searching for the lyrics on the interne. In this typical method, if a music file does not contain lyrics, a user searches for the lyrics on the Internet using a personal computer (PC), downloads the lyrics, and prints the lyrics using a printer.

Figure 1A:
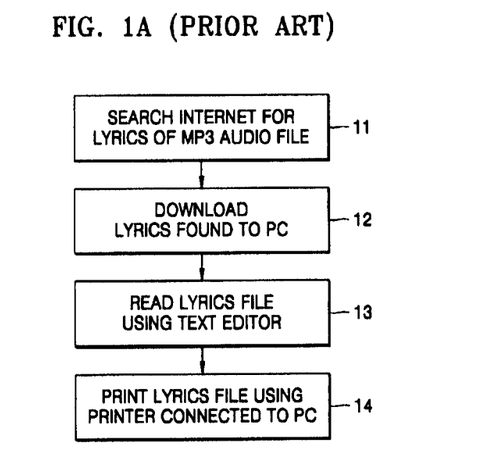
FIG. 1A is a flowchart illustrating a conventional method of printing lyrics of a music file.

FIG. 1A is a flowchart illustrating a conventional method of printing lyrics of an MP3 music file. Referring to FIG. 1A, lyrics of an MP3 music file are searched for on the Internet using a PC (operation 11). A lyrics file found is downloaded to the PC (operation 12). The lyrics file is read using a text editor that supports a print function (operation 13). The read lyrics file is printed using a printer connected to the PC (operation 14).

Another method can be used for a music file that contains lyrics as metadata. In this case, the music file is downloaded from an editor that supports parsing of the metadata and the music file is printed using a printer.

Figure 1B:
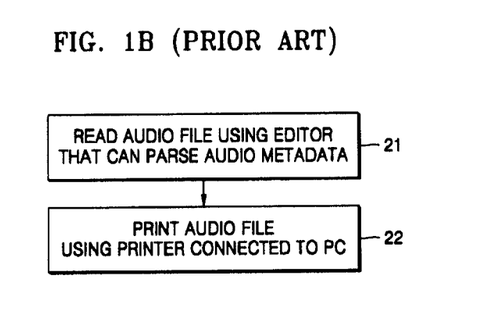
FIG. 1B is a flowchart illustrating another conventional method of printing lyrics of a music file.

FIG. 1B is a flowchart illustrating another conventional method of printing lyrics of a music file. Referring to FIG. 1B, an audio file is read using an editor that can parse audio metadata (operation 21) and printed using a printer connected to a PC (operation 22).

As described above, to print lyrics of a song while listening to the song, a user has to search the Internet for data containing the lyrics of the song and print the data. Alternatively, if a music file includes metadata, the music file must be transferred to the PC, loaded to an editor on the PC, which can parse metadata, and printed.

However, such methods require a lot of processes. Those who are PC savvy may easily handle such processes. However, it is inconvenient and difficult for those who are not PC savvy to carry out such processes. Also, for printing, a printer driver must be installed in a PC.

Recently, the contents of audio files, such as MP3 and WMA files, have increasingly become fee-based content. When sold, these audio files already contain metadata containing basic information, such as title, artist, album, genre, year and lyrics. Therefore, there is no need for a user to input such information, and such fee-based contents are becoming more popular.

As cameras become more versatile, it is possible to print images or text pictures using a direct print function of a camera as well as manage image files. However, it is not possible to print other multimedia meta information.

SUMMARY OF THE INVENTION

The present invention provides a printing method and apparatus, a print control method, a multimedia apparatus, and a computer-readable recording medium on which programs for executing the methods are recorded, which enable a user to easily print metadata of an audio file by reading the metadata directly from a memory card, or using a USB or Bluetooth transmission method.

According to an aspect of the present invention, there is provided a printing method including: receiving additional information of a multimedia file from a multimedia apparatus, interpreting the additional information of the multimedia file and obtaining at least one item included in the additional information, and printing the obtained at least one item.

The receiving of the additional information of the multimedia file may include receiving a print request which requests printing of the additional information of the multimedia file from the multimedia apparatus, requesting the additional information of the multimedia file from the multimedia apparatus, in response to the print request which is received, and receiving the additional information of the multimedia file from the multimedia apparatus, in response to the request for the additional information.

The at least one item may include at least one of title, artist, genre, lyrics, and thumbnail image data.

According to another aspect of the present invention, there is provided a printing method including receiving a request to print additional information of a multimedia file from a multimedia apparatus, requesting at least one item which is included in the additional information from the multimedia apparatus, in response to the request, receiving the at least one item which is requested, and printing the at least one item which is received.

According to another aspect of the present invention, there is provided a printing method including reading a multimedia file from a removable memory device that stores the multimedia file, interpreting additional information of the multimedia file and obtaining at least one item included in the additional information, and printing the obtained at least one item.

The at least one item may include items selected by a user though a user interface.

According to another aspect of the present invention, there is provided a print control method used by a multimedia apparatus. The control method includes transmitting a print request which requests printing of a multimedia file to a printing apparatus, receiving a request to provide additional information of the multimedia file from the printing apparatus, in response to the print request, and transmitting the additional information of the multimedia file to the printing apparatus such that the additional information is printed, in response to the request to provide the additional information.

The transmitting of the additional information includes interpreting the additional information of the multimedia file, obtaining at least one item included in the additional information, and transmitting the additional information to the printing apparatus in units of items.

According to another aspect of the present invention, there is provided a printing apparatus including a control unit which interprets additional information of a multimedia file received from a multimedia apparatus and extracts at least one item included in the additional information, and a print control unit which prints the extracted at least one item.

According to another aspect of the present invention, there is provided a printing apparatus including a control unit which requests a multimedia apparatus to provide at least one item included in additional information of a multimedia file in response to a print request which requests printing of the additional information of the multimedia file from the multimedia apparatus, receiving the at least one item which is requested, and providing the at least one item to a print control unit, and a print control unit which prints the received at least one item.

According to another aspect of the present invention, there is provided a printing apparatus including a control unit which reads a multimedia file from a removable memory device that stores the multimedia file, interprets additional information of the multimedia, and extracts at least one item included in the additional information, and a print control unit printing the extracted at least one item.

According to another aspect of the present invention, there is provided a multimedia apparatus including a control unit which transmits a print request which requests printing of a multimedia file to a printing apparatus, receiving a request for additional information of the multimedia file from the printing apparatus, in response to the print request, and transmits the additional information of the multimedia file to the printing apparatus such that the additional information is printed, in response to the request to provide the additional information, and a storing unit storing the multimedia file.

A computer-readable recording medium on which a program which executes a printing method is recorded, the method including interpreting additional information of a multimedia file received from a multimedia apparatus and obtaining at least one item included in the additional information, and controlling a printing engine to print the obtained at least one item.

According to another aspect of the present invention, there is provided a computer-readable recording medium on which a program which executes a print control method used by a multimedia apparatus is recorded, the method including transmitting a print request which requests printing of a multimedia file to the printing apparatus, receiving a request to provide additional information of the multimedia file from the printing apparatus, in response to the print request, and transmitting the additional information of the multimedia file to the printing apparatus such that the additional information is printed, in response to the request to provide the additional information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE
EXEMPLARY EMBODIMENTS OF THE
INVENTION

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 2:
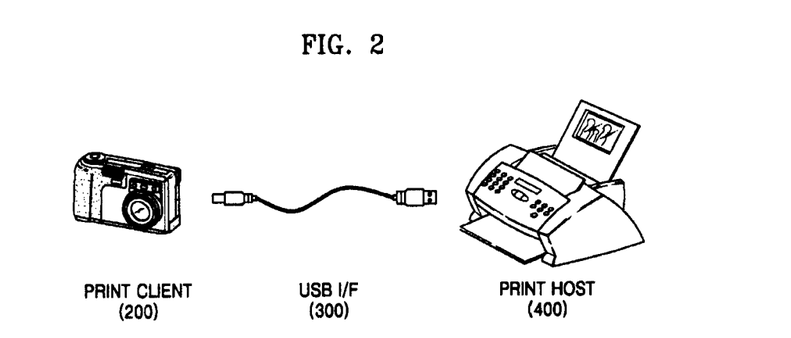
FIG. 2 illustrates a system configuration for printing meta information of a multimedia file according to an exemplary embodiment of the present invention.

FIG. 2 illustrates a system for printing meta information of a multimedia file according to an exemplary embodiment of the present invention. Referring to FIG. 2, the system includes a print client 200, a print host 400, and a Universal Serial Bus (USB) interface 300 connecting the print client 200 to the print host 400 such that the print client 200 and the print host 400 can communicate with each other.

In FIG. 2, a digital camera is shown as the print client 200 by way of example. However, the print client 200 according to the present invention is not limited to the digital camera. The print client 200 may be any apparatus that provides video, audio, still image, or other multimedia functions. For example, the print client 200 may be a digital still camera (DSC), a digital video camcorder (DVC), a portable media player (PMP), a portable communications terminal, or a PC application.

In addition, In FIG. 2, a general printer is shown as the print host 400 by way of example. However, the print host 400 according to the present invention is not limited to the printer. Any apparatus that provides a print function may be used as the print host 400.

A USB interface enables an apparatus, such as a PC or a digital camera, to be connected to a printer. Hence, the printer can receive image data from a digital camera via the USB interface and print the image data. However, in the system according to an exemplary embodiment of the present invention, the printer, i.e., the print host 400, may not always be connected to the digital camera, i.e., the print client 200, by the USB interface 300. A plurality of interfaces for wireless communications and other types of interfaces for wired communications may also be used. For example, a plurality of interfaces, such as infrared communication interfaces and Bluetooth wireless communication interfaces, may be provided as the USB interface 300.

In this system, if the print client 200, which is a multimedia provider, generates a print command to print meta information of a multimedia file and sends the print command to the print host 400 via the USB interface 300, the print host 400 may receive and parse the multimedia file or the meta information of the multimedia file, and print the parsed multimedia file or the parsed meta information of the multimedia file in response to the print command. Alternatively, the print host 400 may request the print client 200 for items included in the meta information of the multimedia file. Then, the print client 200 may obtain the items by parsing the meta information and transmit the items to the print host 400 one by one.

A multimedia file used in an exemplary embodiment of the present invention includes an audio file, a video file, and a file for language study purposes. Each multimedia file contains data and additional information regarding the data. Such additional information is also called meta information.

Figure 3A:
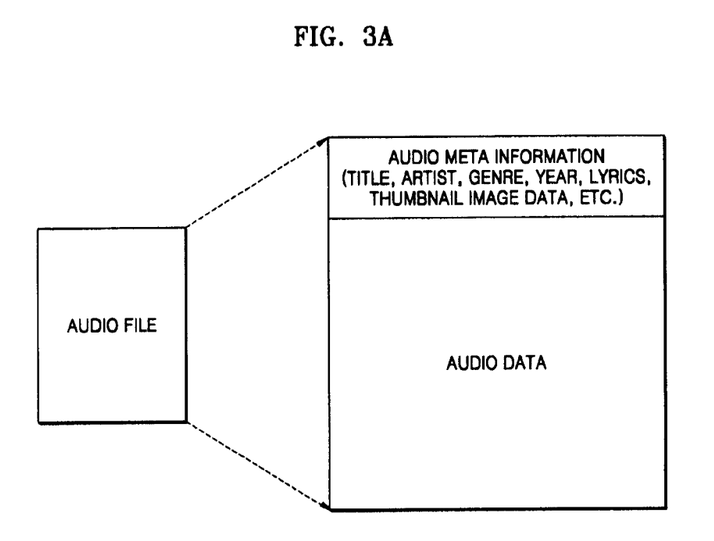
FIGS. 3A through 3C illustrate the configuration of an audio file used in an exemplary embodiment of the present invention.

FIG. 3A illustrates the configuration of an audio file used in an exemplary embodiment of the present invention. The audio file is a multimedia file whose metadata can be printed. The format of the audio file is shown in FIG. 3A. The audio file is composed of audio meta information and audio data. The audio meta information is information regarding the audio data. For example, the audio meta information includes title, artist, album, genre, year, lyrics, and thumbnail image data.

Figure 3B:
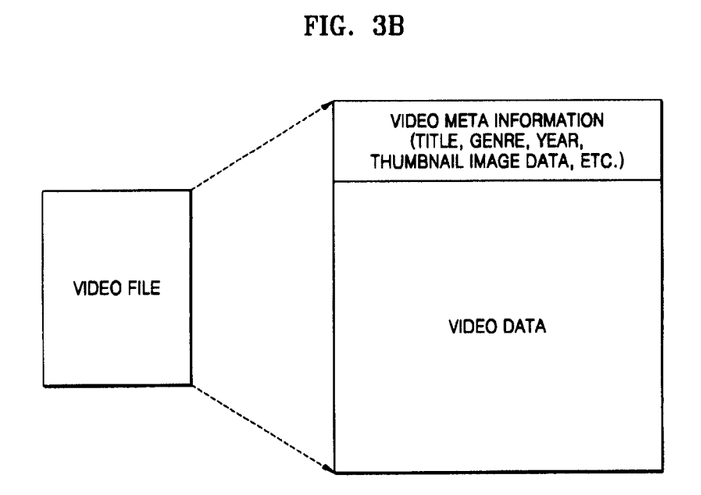

FIG. 3B illustrates the configuration of a video file used in an exemplary embodiment of the present invention. The video file is composed of video meta information and video data. The video meta information is information regarding the video data. For example, the video meta information includes title, genre, year, subtitle, and thumbnail image data.

Figure 3C:
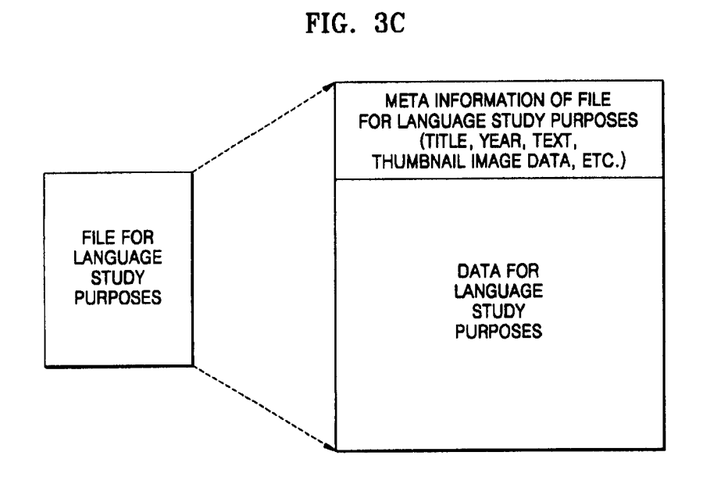

FIG. 3C illustrates the configuration of a file for language study purposes used in an exemplary embodiment of the present invention. The file for language study purposes is composed of meta information of data for language study purposes and the data for language study purposes. The meta information of the data for language study purposes is information regarding the data for language study purposes. For example, the meta information includes title, text, and thumbnail image data.

Figure 4:
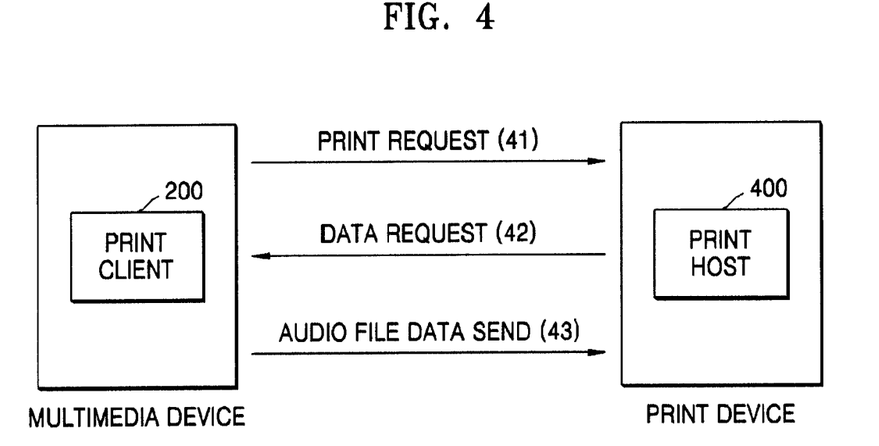
FIG. 4 illustrates a process of printing meta information of a multimedia file according to an exemplary embodiment of the present invention.

FIG. 4 illustrates a process of printing meta information of a multimedia file according to an exemplary embodiment of the present invention. Referring to FIG. 4, a multimedia device includes the print client 200, and a print device includes the print host 400. The print client 200 is included in the multimedia device to support a print function according to an exemplary embodiment of the present invention. The print host 400 is included in a print device to the print device to support the print function according to an exemplary embodiment of the present invention.

A printing operation according to an exemplary embodiment of the present invention will now be described with reference to FIG. 4. The print client 200 transmits a print request command to the print host 400 (operation 41). Such a print request command transmitted from the print client 200 to the print host 400 may include meta information of a multimedia file to be printed and identification information of the multimedia file.

The print host 400, which receives the print request command, transmits a data request command for requesting data of the multimedia file to be printed to the print client 200 (operation 42).

The print client 200 receives the data request command and provides the requested multimedia file or the meta information included in the multimedia file to the print host 400.

The print host 400 receives the multimedia file or the meta information included in the multimedia file. When receiving the multimedia file, the print host 400 extracts the meta information from the multimedia file, obtains one or more items included in the meta information by parsing the meta information, and prints the one or more items. Items refer to elements included in meta information. For example, if the multimedia file is an audio file, items of the multimedia file may include title, artist, album, genre, year, lyrics, and thumbnail image data. When receiving the meta information of the multimedia file, the print host 400 obtains one or more items by parsing the meta information and prints the one or more items.

Figure 5:
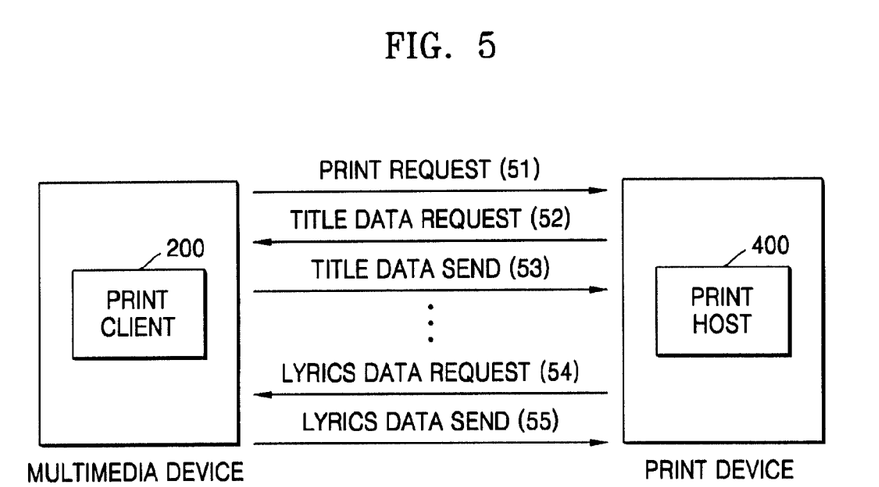
FIG. 5 illustrates a process of printing meta information of a multimedia file according to another exemplary embodiment of the present invention.

FIG. 5 illustrates a process of printing meta information of a multimedia file according to another exemplary embodiment of the present invention. In the exemplary embodiment illustrated in FIG. 4, the print host 400 parses meta information of a multimedia file. However, in the exemplary embodiment illustrated FIG. 5, print client 200 parses meta information of a multimedia file.

Referring to FIG. 5, the print client 200 transmits a print request command to a print host 400 (operation 51). Such a print request command transmitted from the print client 200 to the print host 400 may include meta information of a multimedia file to be printed, identification information of the multimedia file, and information regarding one or more items included in the meta information. If the multimedia file is an audio file, the information regarding the items of the multimedia file may include title, artist, album, genre, year, lyrics, and thumbnail image data.

The print host 400, which receives the print request command, transmits a data request command for requesting the items included in the meta information of the multimedia file to be printed to the print client 200. For example, the print host 400 may request title data, which is one of the items (operation 52).

The print client 200, which receives the data request command, obtains, for example, the title data by parsing the meta information included in the requested multimedia file and provides the title data to the print host 400. The print host 400 receives the title data from the print client 200 and stores the title data. The print host 400 may also obtain data for other items included in the meta information by performing operations 51 and 52.

The print host 400 finally requests lyrics data, which is also one of the items (operation 54). The print client 200, which receives the lyrics data request command, obtains the requested lyrics data from the parsed meta information and provides the lyrics data to the print host 400 (operation 55).

The print host 400 receives the lyrics data and prints item data, which was received from the print client 200 so far, according to a predetermined format.

Figure 6:
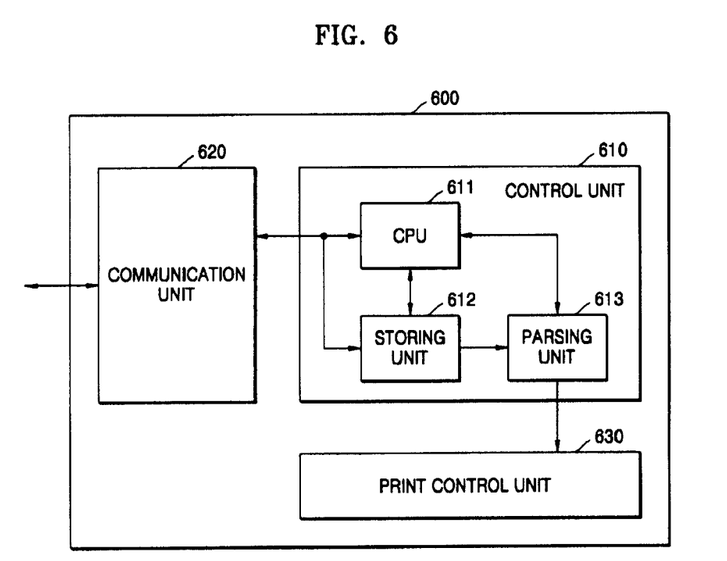
FIG. 6 illustrates the configuration of a print host according to an exemplary embodiment of the present invention.

FIG. 6 illustrates the configuration of a print host 600 according to an exemplary embodiment of the present invention. Referring to FIG. 6, the print host 600 includes a control unit 610, a communication unit 620, and a print control unit 630.

The control unit 610 controls each element and processing operation of the print host 600. In other words, the control unit 610 of the print host 600 controls the operation of a printer.

The control unit 610 includes a central processing unit (CPU) 611, a read-only memory (ROM) storing programs executed by the CPU 611, a random-access memory (RAM) used as a work area of the CPU 611 and to temporarily store various data, and other related devices.

The communication unit 620 provides a communication function between a print client and the print host 600. In other words, the communication unit 620 transmits and receives data between the print client and the print host 600.

Under the control of the control unit 610, the print control unit 630 controls a print engine to print meta information of a multimedia file. The print control unit 630 may include the print engine.

The control unit 610 includes the CPU 611, a storing unit 612, and a parsing unit 613. The CPU 611 interprets a command transmitted from the print client and transmits a response to the interpreted command to the print client. The CPU 611 also controls the storing unit 612, the communication unit 620, and the parsing unit 613.

The storing unit 612 stores a multimedia file, meta information of the multimedia file or item data of the meta information transmitted from the print client via the communication unit 620.

The parsing unit 613 reads the multimedia file or the meta information of the multimedia file and obtains one or more item data contained in the meta information by parsing the meta information.

The operation of the print host 600 of FIG. 6 will now be described. When receiving a print request command from the print client 200 via the communication unit 620, the CPU 611 transmits a data request command to the print client via the communication unit 620. If the print host 600 supports parsing of meta information according to an exemplary embodiment of the present invention, the CPU 611 transmits a data request command for requesting a multimedia file or meta information of the multimedia file. If the print client parses meta information according to another exemplary embodiment of the present invention, the CPU 611 transmits a data request command for requesting each of items included in the meta information.

The multimedia file, the meta information of the multimedia file, or item data received via the communication unit 620 as a result of such data requests are stored in the storing unit 612. If the item data is stored in the storing unit 612, the item data is transmitted to the print control unit 630, which then controls a printing unit (not shown) to print the item data. If the multimedia file or the meta information of the multimedia file is stored in the storing unit 612, the parsing unit 613 retrieves the multimedia file or the meta information of the multimedia file from the storing unit 612, parses the meta information of the multimedia file, and obtains item data contained in the meta information. The item data obtained by the parsing unit 613 is transmitted to the print control unit 630, which then controls the printing unit to print the item data.

Figure 7:
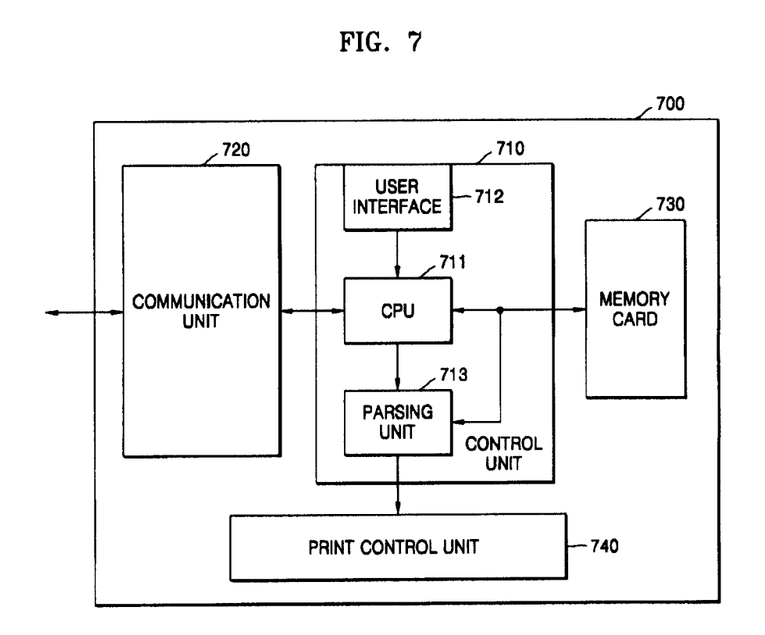
FIG. 7 illustrates the configuration of a print host according to another exemplary embodiment of the present invention.

FIG. 7 illustrates the configuration of a print host 700 according to another exemplary embodiment of the present invention. Referring to FIG. 7, the print host 700 includes a control unit 710, a communication unit 720, a memory card 730, and a print control unit 740.

The control unit 710 controls each element and processing operation of the print host 700. In other words, the control unit 710 of the print host 700 controls the operation of a printer. The control unit 710 includes a CPU 711, a ROM storing programs executed by the CPU 711, a RAM used as a work area of the CPU 711 and temporarily storing various data, and other related devices.

The communication unit 720 provides a communication function between a print client and the print host 700. In other words, the communication unit 720 transmits and receives data between the print client and the print host 700.

The memory card 730 is a removable memory card and can be inserted into a slot of the print host 700. The memory card 730, which is used in a multimedia device such as a digital camera, may also be loaded into the print host 800.

Under the control of the control unit 710, the print control unit 740 controls a print engine to print meta information of a multimedia file. The print control unit 740 may include the print engine.

The control unit 710 includes the CPU 711, a user interface 712, and a parsing unit 713. The CPU 711 interprets a command transmitted from the print client and transmits a response to the print client, based on the interpretation of the command. The CPU 711 also controls the user interface 712, the communication unit 720, the parsing unit 713, and the memory card 730.

The user interface 712 outputs information regarding the multimedia file stored in the memory card 730 and the composition of each item of the meta information of the multimedia file to provide such information to a user. Also, the user interface 712 receives information regarding a selection by the user and provides the information to the CPU 711. An LCD display or a touch screen may be used as the user interface 712.

The parsing unit 713 reads the multimedia file or the meta information of the multimedia file from the memory card 730, parses the meta information, and obtains one or more item data contained in the meta information.

The operation of the print host 700 will now be described. When detecting that the memory card 730 is inserted into the slot of the print host 700, the CPU 711 provides information regarding multimedia files or information regarding items included in meta information of the multimedia files to the user interface 712 such that the user interface 712 outputs the information. Then, a user selects a multimedia file that the user desires to print or an item included in the meta information. Accordingly, the user interface 712 provides information regarding the selection by the user to the CPU 711. The CPU 711 provides the information to the parsing unit 713, which then parses the information.

When receiving the information regarding a multimedia file or an item selected by the user, the parsing unit 713 reads the selected multimedia file and parses meta information included in the selected multimedia file. If the user selects all multimedia files, the parsing unit 713 provides all of the item data that is obtained by parsing meta information of all multimedia files to the print control unit 740 such that all of the item data can be output. If the user selects some of the multimedia files, the parsing unit 713 provides only the selected items to the print control unit 740 such that the selected items can be output.

Figure 8:
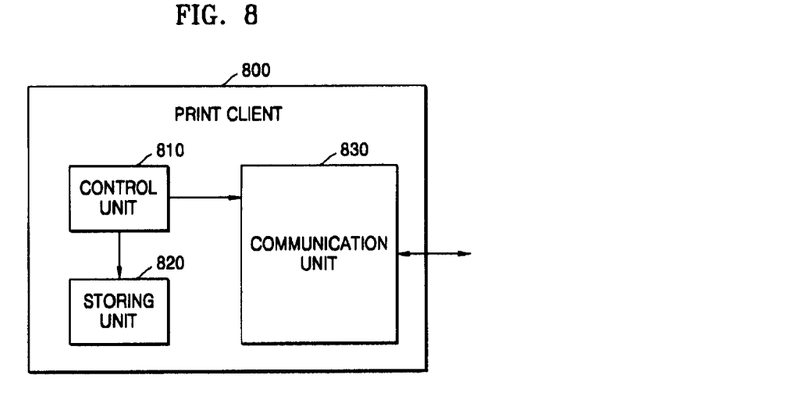
FIG. 8 illustrates the configuration of a print client according to an exemplary embodiment of the present invention.

FIG. 8 illustrates the configuration of a print client 800 according to an exemplary embodiment of the present invention. Referring to FIG. 8, the print client 800 includes a control unit 810, a storing unit 820, and a communication unit 830.

The control unit 810 controls the entire operation of the print client 800. In particular, the control unit 810 transmits a print request command to a print host via the communication unit 830 or interprets a command transmitted from the print host and provides a response or data to the print host based on the interpretation of the command.

The storing unit 820 stores multimedia files. The communication unit 830 provides a communication function between the print client 800 and the print host. In other words, the communication unit 830 transmits and receives data between the print client 800 and the print host.

If the print host parses meta information of a multimedia file, the print client 800 provides only a multimedia file or meta information of the multimedia file to the print host. If the print client 800 parses meta information of a multimedia file and provides each item to the print host, the print client 800 must include a parser that can parse meta information of a multimedia file. In FIG. 8, such a parser is not shown.

Figure 9:
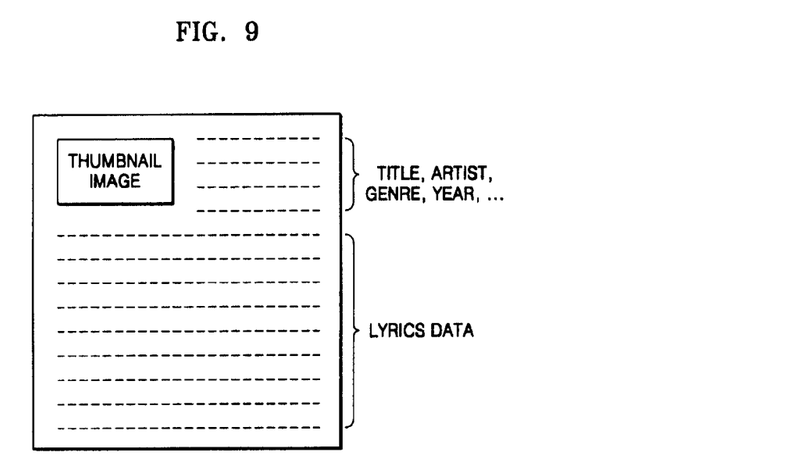
FIG. 9 illustrates an example of meta information of a multimedia file printed according to an exemplary embodiment of the present invention.

FIG. 9 illustrates an example of meta information of a multimedia file printed according to an exemplary embodiment of the present invention. For example, if meta information of an audio file is printed, thumbnail image, title, artist, genre, year, and lyrics data may be printed as illustrated in FIG. 9.

As described above, exemplary embodiments of the present invention provide a method of easily printing metadata information of a multimedia file without using a PC. Therefore, a user can easily print metadata information of a multimedia file without going through complicated processes.

Since image or texts can be transmitted using a conventional USB or Bluetooth transmission method, no hardware change is required. Thus, a software module can be added to current protocol without significantly increasing costs.

In addition, memory media can be directly inserted into a print device, and the same level of printing performance as when using the USB or Bluetooth data transmission method can be achieved.

In the case of an audio file for language study purposes, printed outputs of synchronized audio data can be easily obtained without requiring a user to read from a textbook.

Further, aspects of the present invention can be applied to DSCs, DVCs, PMPs, cell phones, PC applications, printers, and all printing related devices.

The exemplary embodiments of the present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion. Also, functional programs, codes, and code segments for accomplishing aspects of present invention can be easily construed by programmers skilled in the art to which the present invention pertains.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A printing method in a printer, comprising:
receiving additional information which is extracted from a digital multimedia file from a portable multimedia apparatus;
interpreting the additional information which is received and obtaining at least one item which is included in the additional information; and
printing the at least one item which is obtained,
wherein the additional information of the digital multimedia file is stored within the digital multimedia file,
the additional information is received directly from the portable multimedia apparatus and not through a computer,
the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes, and
wherein the receiving the additional information of the digital multimedia file comprises:
receiving a print request which requests printing of the additional information of the digital multimedia file from the portable multimedia apparatus.

2. The method of claim 1, wherein the receiving the additional information of the digital multimedia file comprises:
requesting the additional information of the digital multimedia file from the portable multimedia apparatus, in response to the print request which is received; and
receiving the additional information of the digital multimedia file from the portable multimedia apparatus, in response to the request for the additional information.

3. The method of claim 1, wherein the at least one item which is included in the additional information includes at least one of a title, an artist, a genre, lyrics, and thumbnail image data.

4. The method of claim 1, wherein the additional information of the digital multimedia file is metadata.

5. The method of claim 1, wherein the portable multimedia apparatus is a digital still camera, a digital video camcorder, or a portable media player.

6. The method of claim 1, wherein the digital multimedia file is an audio file comprising the audio meta information and the audio data.

7. The method of claim 1, wherein the digital multimedia file is a video file comprising the video meta information and the video data.

8. The method of claim 1, wherein the digital multimedia file is a file for language study purposes comprising the language study meta information and the data for language study purposes.

9. A printing method in a printer, comprising:
receiving a request to print additional information of a digital multimedia file from a portable multimedia apparatus;
requesting at least one item which is included in the additional information which is extracted from the digital multimedia file from the portable multimedia apparatus, in response to the request;
receiving the at least one item which is requested; and
printing the at least one item which is received,
wherein the additional information of the digital multimedia file is stored within the digital multimedia file,
the request to print the additional information and the at least one item which is requested are directly received from the portable multimedia apparatus and not through a computer, the request of the at least one item is directly transmitted to the portable multimedia apparatus and not through a computer, and the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes.

10. A method controlling a printing apparatus by a portable multimedia apparatus, the method comprising:

transmitting a print request which requests printing of a digital multimedia file to the printing apparatus;

receiving a request to provide additional information of the digital multimedia file from the printing apparatus, in response to the print request; and transmitting the additional information which is extracted from the digital multimedia file to the printing apparatus such that the additional information is printed, in response to the request to provide the additional information which is received, wherein the additional information of the digital multimedia file is stored within the digital multimedia file, the print request and the additional information are directly transmitted to the printing apparatus and not through a computer, the request to provide additional information is directly received from the printing apparatus and not through a computer, and the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes.

11. The print control method of claim 10, wherein the transmitting of the additional information comprises interpreting the additional information of the digital multimedia file, obtaining at least one item which is included in the additional information, and transmitting the additional information to the printing apparatus in units of items.

12. A printing apparatus comprising:

a control unit, comprising a processor, which interprets additional information which is extracted from a digital multimedia file which is received from a portable multimedia apparatus and extracts at least one item which is included in the additional information; and a print control unit which prints the at least one item which is extracted, wherein the additional information of the digital multimedia file is stored within the digital multimedia file, the additional information is directly received from the portable multimedia apparatus and not through a computer, and the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes, wherein the control unit receives a request to print the additional information of the digital multimedia file from the portable multimedia apparatus.

13. The apparatus of claim 12, wherein the control unit requests the portable multimedia apparatus to provide the additional information of the digital multimedia file, in response to the request, and the control unit receives the additional information of the digital multimedia file from the portable multimedia apparatus.

14. The apparatus of claim 12, wherein the at least one item includes at least one of a title, an artist, a genre, lyrics, and thumbnail image data.

15. A printing apparatus comprising:

a control unit, comprising a processor, which requests a portable multimedia apparatus to provide at least one item which is included in additional information which is extracted from a digital multimedia file in response to a print request which requests printing of the additional information of the digital multimedia file from the portable multimedia apparatus, receives the at least one item which is requested, and provides the at least one item which is received to a print control unit; and a print control unit which prints the at least one item which is received, wherein the additional information of the digital multimedia file is stored within the digital multimedia file, the request to provide at least one item is directly transmitted to the portable multimedia apparatus and not through a computer, the print request of printing of the additional information and the at least one item which is requested are directly received from the portable multimedia apparatus and not through a computer, and the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes.

16. A printing apparatus comprising:

a control unit, comprising a processor, which reads a digital multimedia file from a removable memory device that stores the digital multimedia file, interprets additional information which is extracted from the digital multimedia file, and extracts at least one item which is included in the additional information; and a print control unit which prints the at least one item which is extracted, wherein the additional information of the digital multimedia file is stored within the digital multimedia file, and the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes, wherein the control unit receives a request to print the additional information of the digital multimedia file from a portable multimedia apparatus.

17. The apparatus of claim 16, wherein the control unit provides, to the print control unit, items which are selected from the at least one item through a user interface.

18. A portable multimedia apparatus comprising:
a control unit, comprising a processor, which transmits a print request which requests printing of a digital multimedia file to a printing apparatus, receives a request to provide additional information which is extracted from digital the multimedia file from the printing apparatus, in response to the print request, and transmits the additional information of the digital multimedia file to the printing apparatus such that the additional information is printed, in response to the request to provide the additional information; and
a storing unit which stores the digital multimedia file,
wherein the additional information of the digital multimedia file is stored within the digital multimedia file,
the print request and the additional information are directly transmitted to the printing apparatus and not through a computer,
the request to provide additional information is directly received from the printing apparatus and not through a computer, and
the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes.

19. The apparatus of claim 18, wherein the control unit interprets the additional information of the digital multimedia file, obtains at least one item which is included in the additional information, and transmits the additional information to the printing apparatus in units of items.

20. A non-transitory computer-readable recording medium on which a program which executes a printing method is recorded, the method comprising:
interpreting additional information which is extracted from a digital multimedia file which is received from a portable multimedia apparatus and obtaining at least one item which is included in the additional information; and
controlling a printing engine to print the at least one item which is obtained,
wherein the additional information of the digital multimedia file is stored within the digital multimedia file,
the additional information and a print request are directly received from the portable multimedia apparatus and not through a computer, and
the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes.

21. A non-transitory computer-readable recording medium on which a program which executes a print control method used by a portable multimedia apparatus is recorded, the method comprising:
transmitting a print request which requests printing of a digital multimedia file to the printing apparatus;
receiving a request to provide additional information which is extracted from the digital multimedia file from the printing apparatus, in response to the print request; and
transmitting the additional information of the digital multimedia file to the printing apparatus such that the additional information is printed, in response to the request to provide the additional information,
wherein the additional information of the digital multimedia file is stored within the digital multimedia file,
the print request and the additional information are directly transmitted to the printing apparatus and not through a computer,
the request to provide additional information is directly received from the printing apparatus and not through a computer, and
the digital multimedia file comprises multimedia data and the additional information, the multimedia data comprises at least one of audio data, video data and data for language study purposes, and the item comprises at least one of audio meta information regarding the audio data, video meta information regarding the video data, and language study meta information regarding the data for language study purposes.

* * * * *